United States Patent
Park et al.

(10) Patent No.: US 8,990,731 B2
(45) Date of Patent: Mar. 24, 2015

(54) MOBILE TERMINAL AND METHOD OF CONTROLLING THE SAME

(75) Inventors: Jieun Park, Seoul (KR); Shinhae Lee, Seoul (KR); Hayang Jung, Seoul (KR); Seunghyun Woo, Seoul (KR)

(73) Assignee: LG Electtronics Inc., Seoul (KR)

( * ) Notice: Subject to any disclaimer, the term of this patent is extended or adjusted under 35 U.S.C. 154(b) by 105 days.

(21) Appl. No.: 13/559,391

(22) Filed: Jul. 26, 2012

(65) Prior Publication Data

US 2013/0036386 A1 Feb. 7, 2013

(30) Foreign Application Priority Data

Aug. 3, 2011 (KR) .................. 10-2011-0077179

(51) Int. Cl.
- *G06F 3/048* (2013.01)
- *G06F 3/00* (2006.01)
- *H04M 1/725* (2006.01)
- *G06F 3/0485* (2013.01)
- *G06F 3/0488* (2013.01)
- *G06F 3/0481* (2013.01)

(52) U.S. Cl.
CPC ......... *H04M 1/72544* (2013.01); *G06F 3/0485* (2013.01); *G06F 3/04883* (2013.01); *G06F 3/0481* (2013.01); *G06F 2203/04806* (2013.01)
USPC ............................ 715/831; 715/784; 715/730

(58) Field of Classification Search
CPC ................ G06F 3/0485; G06F 3/0482; G06F 17/30716; G06F 2203/04104
USPC .......................................... 715/831, 784, 730
See application file for complete search history.

(56) References Cited

U.S. PATENT DOCUMENTS

| | | | | |
|---|---|---|---|---|
| 7,479,948 B2 * | 1/2009 | Kim et al. | ..................... | 345/173 |
| 7,917,865 B2 * | 3/2011 | Saijo et al. | ..................... | 715/784 |
| 8,245,255 B2 * | 8/2012 | Schlarb | ........................... | 725/52 |
| 8,271,898 B1 * | 9/2012 | Mattos et al. | ................. | 715/784 |
| 8,429,555 B2 * | 4/2013 | Cho et al. | ...................... | 715/784 |
| 8,438,496 B1 * | 5/2013 | Hegde | .......................... | 715/785 |
| 8,509,854 B2 * | 8/2013 | Kim et al. | ..................... | 455/566 |
| 8,527,899 B2 * | 9/2013 | Miyazawa et al. | ............ | 715/784 |
| 8,624,933 B2 * | 1/2014 | Marr et al. | .................... | 345/684 |
| 8,856,684 B2 * | 10/2014 | Duhig | .......................... | 715/830 |
| 2008/0155475 A1 | 6/2008 | Duhig | | |
| 2010/0058228 A1 * | 3/2010 | Park | .............................. | 715/786 |
| 2010/0125785 A1 * | 5/2010 | Moore et al. | .................. | 715/702 |

(Continued)

FOREIGN PATENT DOCUMENTS

| | | |
|---|---|---|
| CN | 1451110 | 10/2003 |
| CN | 1902912 | 1/2007 |

(Continued)

OTHER PUBLICATIONS

European Patent Office Application Serial No. 12005504.1, Search Report dated Dec. 10, 2012, 7 pages.

(Continued)

*Primary Examiner* — David Phantana Angkool

(74) *Attorney, Agent, or Firm* — Lee, Hong, Degerman, Kang & Waimey

(57) ABSTRACT

The present invention relates to a mobile terminal and a method of controlling the same. When a plurality of items displayed on a screen is scrolled, a scroll speed of some of the plurality of items is controlled to be different from a scroll speed of the other items.

16 Claims, 19 Drawing Sheets

(56) References Cited

U.S. PATENT DOCUMENTS

| | | | |
|---|---|---|---|
| 2010/0134425 A1* | 6/2010 | Storrusten | 345/173 |
| 2010/0175018 A1* | 7/2010 | Petschnigg et al. | 715/776 |
| 2011/0050594 A1* | 3/2011 | Kim et al. | 345/173 |
| 2011/0074699 A1* | 3/2011 | Marr et al. | 345/173 |
| 2011/0078624 A1* | 3/2011 | Missig et al. | 715/802 |
| 2011/0119578 A1* | 5/2011 | Schwartz | 715/702 |
| 2011/0154196 A1 | 6/2011 | Icho et al. | |
| 2012/0054673 A1* | 3/2012 | Kim et al. | 715/784 |
| 2012/0210270 A1* | 8/2012 | Kwon et al. | 715/777 |
| 2013/0036386 A1* | 2/2013 | Park et al. | 715/831 |
| 2013/0326398 A1* | 12/2013 | Zuverink et al. | 715/784 |
| 2014/0068478 A1* | 3/2014 | Won et al. | 715/765 |

FOREIGN PATENT DOCUMENTS

| | | |
|---|---|---|
| EP | 1770490 | 4/2007 |
| EP | 2159714 | 3/2010 |
| GB | 2411537 | 8/2005 |

OTHER PUBLICATIONS

The State Intellectual Property Office of the People's Republic of China Application Serial No. 201210273607.8, Office Action dated Jul. 3, 2014, 7 pages.

* cited by examiner (a)         (b)

MOBILE TERMINAL AND METHOD OF CONTROLLING THE SAME

CROSS-REFERENCE TO RELATED APPLICATIONS

Pursuant to 35 U.S.C. 119 (a), this application claims the benefit of earlier filing date and right of priority to Korean Patent Application No. 10-20110077179, filed Aug. 3, 2011, the contents of which are hereby incorporated by reference herein in its entirety.

BACKGROUND

1. Field

Embodiments of the present invention may relate to a mobile terminal and, more particularly, to a mobile terminal and a method of controlling the same to control a scroll speed of some of a plurality of items displayed on a screen and a scroll speed of the other items to be different from each other when the plurality of items is scrolled.

2. Background

With rapid development of hardware and software technologies relating to electronic devices including a mobile terminal, the electronic devices can provide or store a variety of functions and information.

Accordingly, the electronic device can store a lot of various information items and provide a scroll function such that a user can access the information items.

According to conventional methods, all information items are scrolled at the same scroll speed, and thus a user may recognize the information items as information having the same degree of importance although the information items may have different degrees of importance.

SUMMARY

An object of the present invention is to provide a mobile terminal and a method of controlling the same to control a scroll speed of some of a plurality of items displayed on a screen and a scroll speed of the other items to be different from each other when the plurality of items is scrolled.

In accordance with one aspect of the invention, a mobile terminal includes a touchscreen configured to display a plurality of items and a controller configured to control a first scroll speed of at least one of items included in a first group, from among the plurality of items, and a second scroll speed of the other items included in a second group to be different from each other when the plurality of items is scrolled, according to a scroll instruction signal.

In accordance with another aspect of the invention, a method of controlling a mobile terminal includes displaying a plurality of items; receiving a scroll instruction signal for instructing the plurality of items to be scrolled; and controlling a first scroll speed of at least one of items included in a first group, from among the plurality of items, and a second scroll speed of the other items included in a second group to be different from each other when the plurality of items is scrolled according to the scroll instruction signal.

According to the motile terminal and method of controlling the same according to embodiments of the present invention, it is possible to control a plurality of items to be scrolled at different speeds such that a user can recognize importance of information based on a scroll speed difference.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments of the present invention will now be described more fully with reference to the accompanying drawings, in which certain embodiments of the invention are illustrated. The invention may, however, be embodied in many different forms and should not be construed as being limited to the embodiments set forth herein; rather, these embodiments are described and/or illustrated so that this disclosure will be more thorough and complete, and will more fully convey the aspects of the invention to those skilled in the art.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system.

Figure 1:
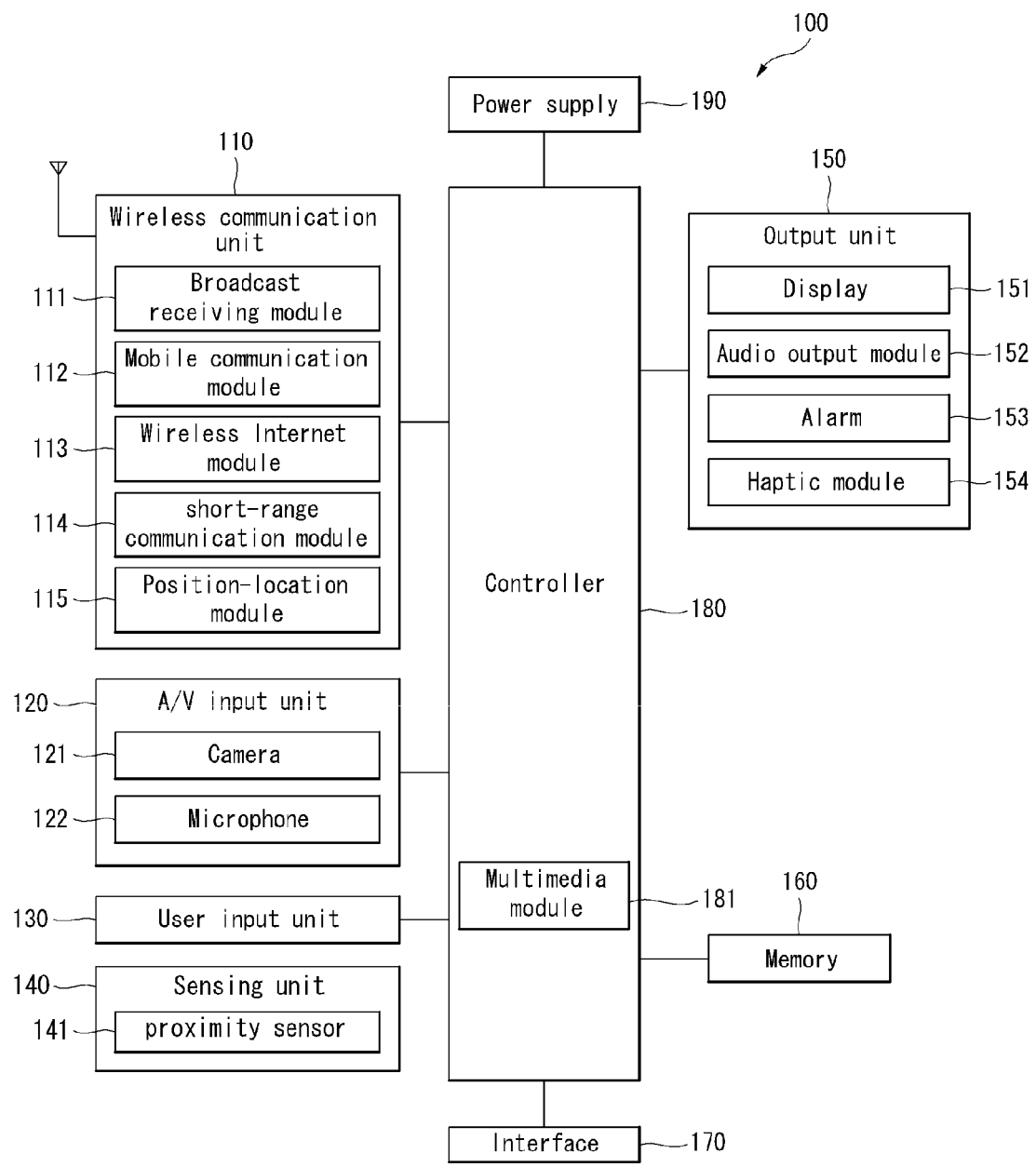
FIG. 1 is a block diagram of a mobile terminal according to an example embodiment.

FIG. 1 is a block diagram of a mobile terminal 100 in accordance with an example embodiment.

The mobile terminal 100 includes a wireless communication unit 110, an audio/video (NV) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (AN) input unit 120 may provide audio or video signal input to the mobile terminal 100. The AN input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the NV input unit 120, may include a noise removing algorithm (or noise canceling algorithm) to remove noise generated in the course of receiving the external audio signal. Data generated by the NV input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a motion detecting sensor 142, a brightness detecting sensor 143, a distance detecting sensor 144, and/or a heat detecting sensor 145. Details of the proximity sensor 141 and the other sensors 142, 143, 144 and 145 may be explained below.

The motion detecting sensor 142 may detect a motion state of the mobile terminal 100 by an external force such as an external shock, an external vibration and/or the like. The motion detecting sensor 142 may detect a motion extent. The motion detecting sensor 142 may be provided with a rotational body and detect a motion of the terminal by detecting a property of a mechanical movement of the rotational body. Based on speed, acceleration and direction of the motion, the motion detecting sensor 142 may detect either the motion extent or a motion pattern and then output the detected one to the controller 180. The motion detecting sensor 142 may include a gyrosensor.

The brightness detecting sensor 143 may detect a brightness of light around the mobile terminal 100 and then output the detected brightness to the controller 180.

The distance detecting sensor 144 may include an ultrasonic sensor or the like. The distance detecting sensor 144 may measure a distance between the mobile terminal 100 and a user and then output the detected distance to the controller 180.

The heat detecting sensor 145 may be provided around the display 151 of the terminal body. The heat detecting sensor 145 may detect the temperature on user's contact with the terminal body and then output the detected temperature to the controller 180.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present invention explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Embodiments of the present invention will now be described.

For description convenience, it is assumed that the display 151 is a touchscreen in the following description. As described above, the touchscreen 151 may execute both an information display function and an information input function. However, the present invention is not limited thereto. Touch referred to in the specification may include contact touch and proximity touch.

Figure 2:
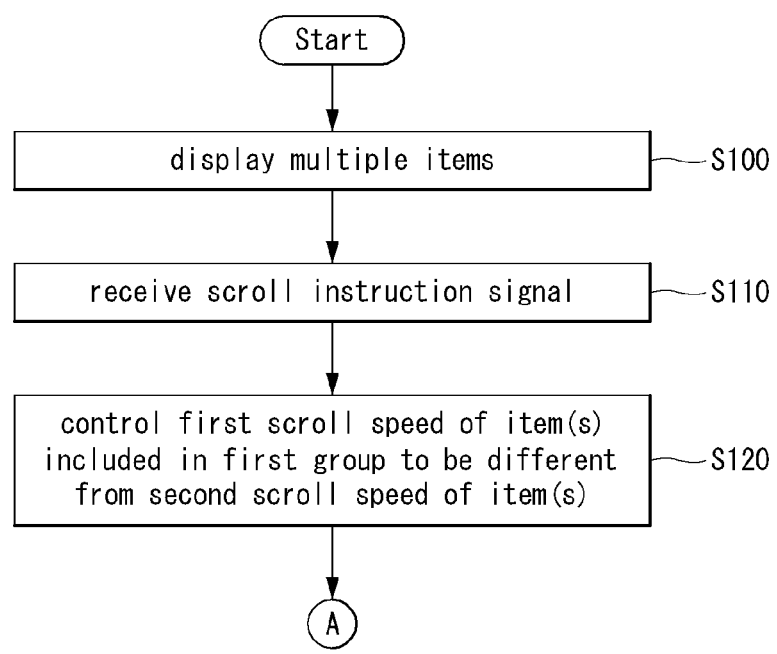
FIG. 2 is a flowchart illustrating a method of controlling a mobile terminal according to a first embodiment of the present invention.

FIG. 2 is a flowchart illustrating a method of controlling a mobile terminal according to a first embodiment of the present invention and FIGS. 3 to 9 are views for explaining the method of controlling a mobile terminal according to the first embodiment of the present invention.

The method of controlling a mobile terminal according to the first embodiment of the present invention may be implemented in the mobile terminal 100 described with reference to FIG. 1. The method of controlling a mobile terminal according to the first embodiment and operations of the mobile terminal 100 to implement the same will now be described in detail with reference to drawings.

Referring to FIG. 2, the controller 180 may display a plurality of items on the touchscreen 151 (S100).

The items include an icon, widget, message, file, video, audio, still image, etc., for example.

Figure 3:
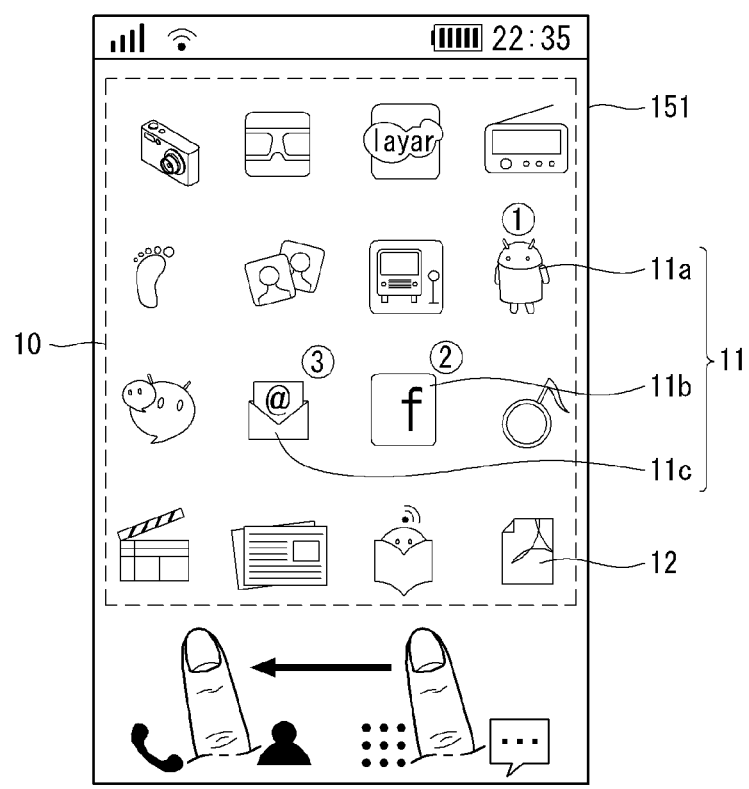
FIGS. 3 to 9 are views for explaining the method of controlling a mobile terminal according to the first embodiment of the present invention.

FIG. 3 shows a plurality of items 10 displayed on the background as an example of step S100.

The controller 180 may receive a scroll instruction signal from a user or according to generation of a specific event (S110).

For example, as shown in FIG. 3, the user can apply a stroke to the touchscreen 151 in a specific direction. The stroke includes a drag operation and a flicking operation.

The controller 180 may control a first scroll speed of at least one of items that belong to a first group from among the plurality of items displayed on the touchscreen 151 and a second scroll speed of the other items that belong to a second group to be different from each other when scrolling the plurality of items displayed on the touchscreen 151 upon receipt of the scroll instruction signal (S120).

The first group and the second group can be set in various manners. The at least one of the items that belong to the first group may relate to a predetermined event or may belong to the first group according to a predetermined standard. Various embodiments of controlling scroll speeds of the first and second groups to be different from each other and various embodiments of the first and second groups will now be described.

Figure 4:
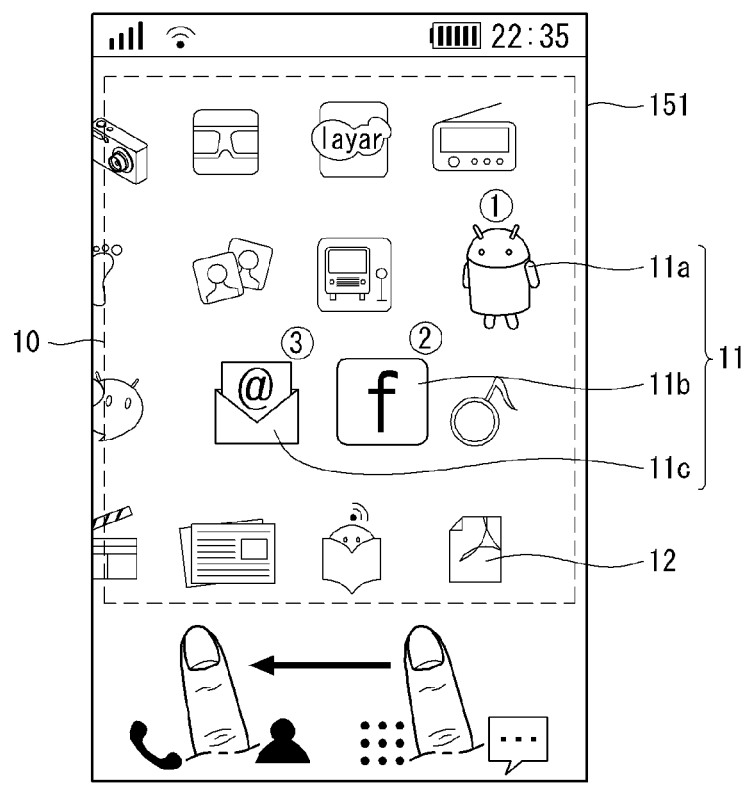
Figure 5:
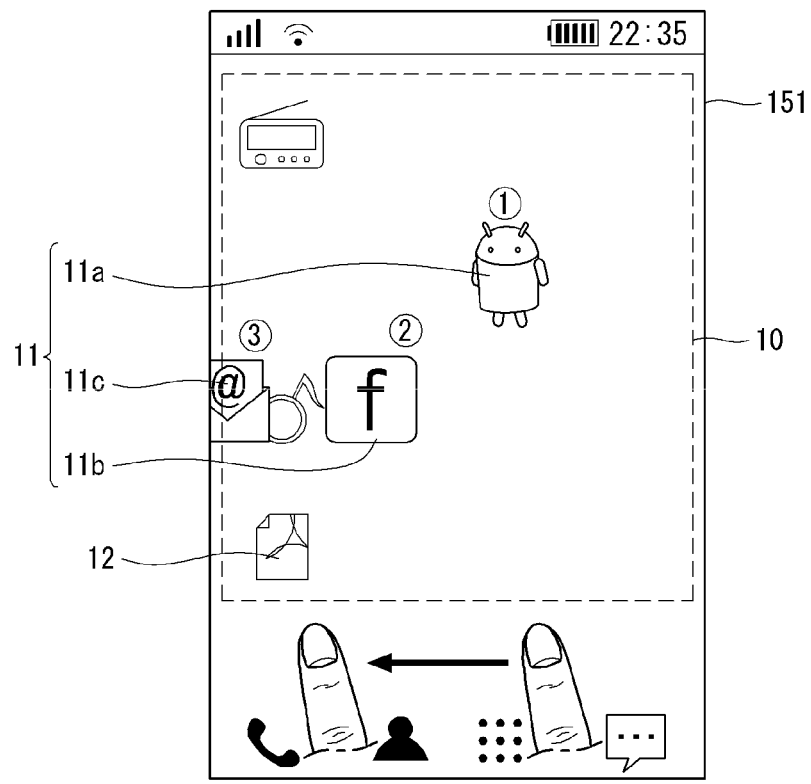

FIGS. 3 to 5 show that the plurality of items corresponds to icons 10 displayed on the background.

Referring to FIG. 3, the first group 11, to which first, second and third icons 11a, 11b and 11c from among the plurality of icons 10 belong, includes icons having update information. The update information may include information relating to update of applications corresponding to the icons and/or information that has been received or will be received through the applications.

In FIGS. 3 to 5, items other than the items belonging to the first group 11 belong to the second group.

The controller 180 may control a first scroll speed at which the first group 11 is scrolled and a second scroll speed at which the second group is scrolled to be different from each other upon receipt of the scroll instruction signal, as shown in FIGS. 3 to 5.

For example, the controller 180 can control a scroll speed of the items 11a, 11b and 11c belonging to the first group 11 to be lower than a scroll speed of the items belonging to the second group.

Accordingly, visibility of the items 11a, 11b and 11c included in the first group 11 currently corresponding to update information can be increased. That is, the items 11a, 11b and 11c are visually recognized by the user for longer time, and thus they call user's attention and induce an operation of the user.

The controller 180 may configure layers respectively corresponding to the first group 11 and the second group such that the layers are different from each other and display the different layers on the touchscreen 151.

For example, the controller 180 can control the depth of a first layer corresponding to the first group 11 to be different from the depth of a second layer corresponding to the second layer.

Referring to FIG. 4, when the scroll instruction signal is input according to a stroke applied to the touchscreen 151 by the user, the controller 180 may control the items 11a, 11b and 11c included in the first group 11 to be seen as if they are protruded from the touchscreen 151.

The controller 180 may return the items 11a, 11b and 11c included in the first group 11 to the original state when the scroll is stopped. That is, the first layer corresponding to the first group 11 and the second layer corresponding to the second group are located on the same plane when the scroll is stopped.

FIGS. 6 to 9 show that the plurality of items corresponds to items relating to communication records.

Figure 6:
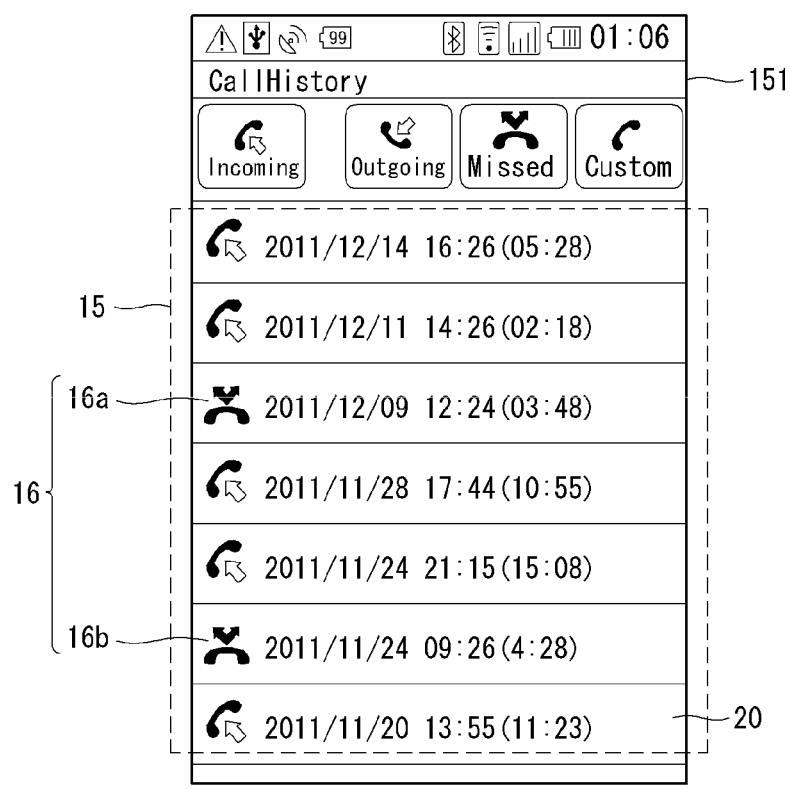
Figure 7:
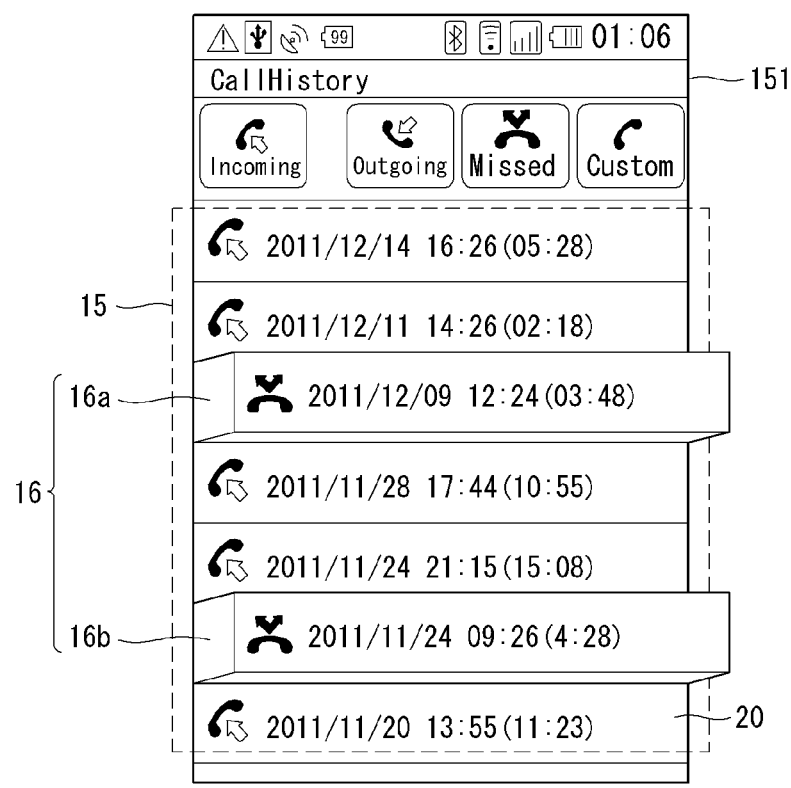

FIGS. 6 and 7 show a case in which the plurality of items corresponds to call receipt items included in a call receipt list.

Referring to FIG. 6, the controller 180 may set items 16a and 16b that requires attention of the user from among call receipt items 15 to the first group 11 and set the other items to the second group.

For example, the items 16a and 16b that requires attention of the user may correspond to calls received from people registered to bookmark or calls performed for longer than a predetermined time.

The controller 180 may control scroll speeds of the first group 16 and the second group to be different from each other when scrolling the call receipt items according to the scroll instruction signal.

Referring to FIG. 7, the scroll speed of the items 16a and 16b that require attention of the user can be controlled to be lower than the scroll speed of the other items. Otherwise, the items 16a and 16b that require attention of the user may be controlled to be seen as if they are projected from the touchscreen when scrolled so as to call attention of the user, as in the case shown in FIG. 4.

In FIGS. 6 and 7, reference numeral 20 denotes a scroll bar.

Figure 8:
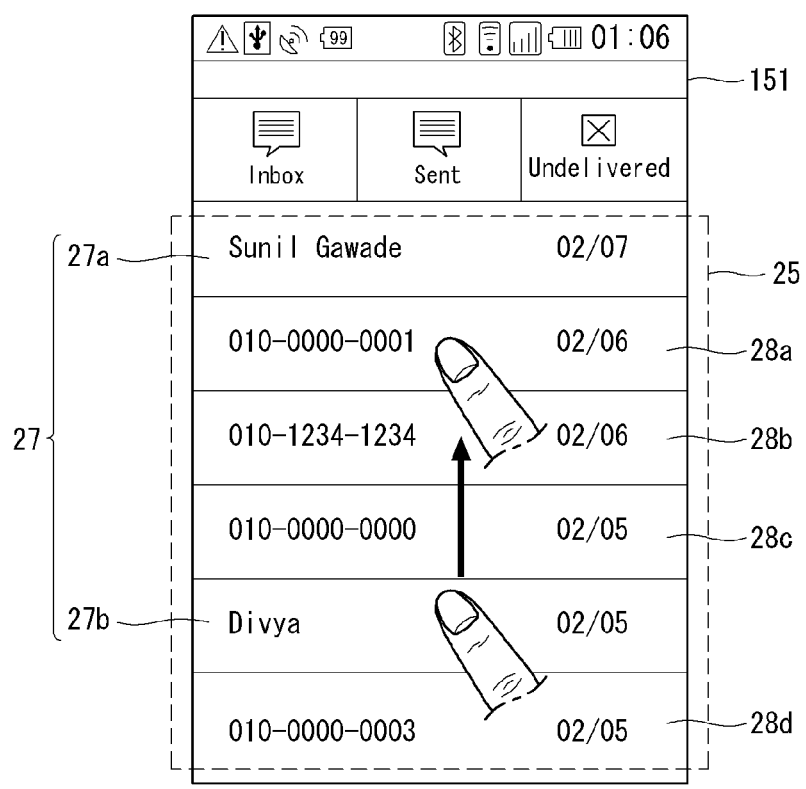
Figure 9:
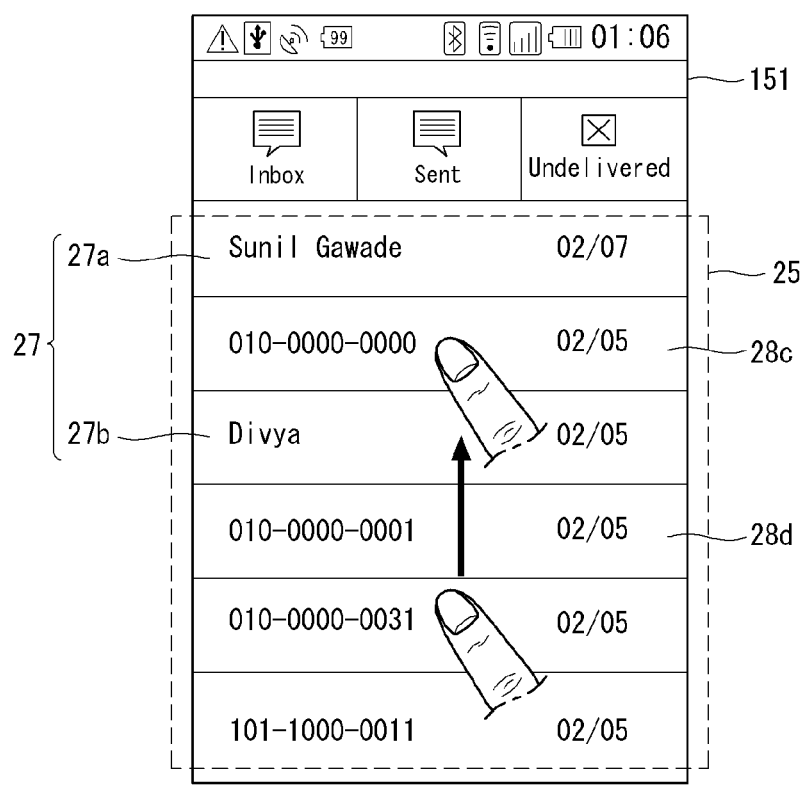

FIGS. 8 and 9 show a case in which the plurality of items corresponds to messages included in a message receipt list. The messages include an SMS (Short Message System) message, an MMS (Multimedia Messaging System) message, an IM (Instant Message), email, etc.

Referring to FIG. 8, the controller 180 can set messages 27a and 27b received from peoples registered to a contact book, from among received messages 25, to the first group 27 and set the other messages (e.g. messages 28a, 28b, 28c and 28d received from peoples who are not registered to the contact book) to the second group.

The controller 180 may control scroll speeds of the first group 27 and the second group to be different from each other when scrolling the received messages 25 in response to the input scroll instruction signal.

Referring to FIG. 9, the scroll speed of the messages 27a and 27b received from the people registered to the contact book is controlled to be lower than the scroll speed of the other messages.

Figure 10:
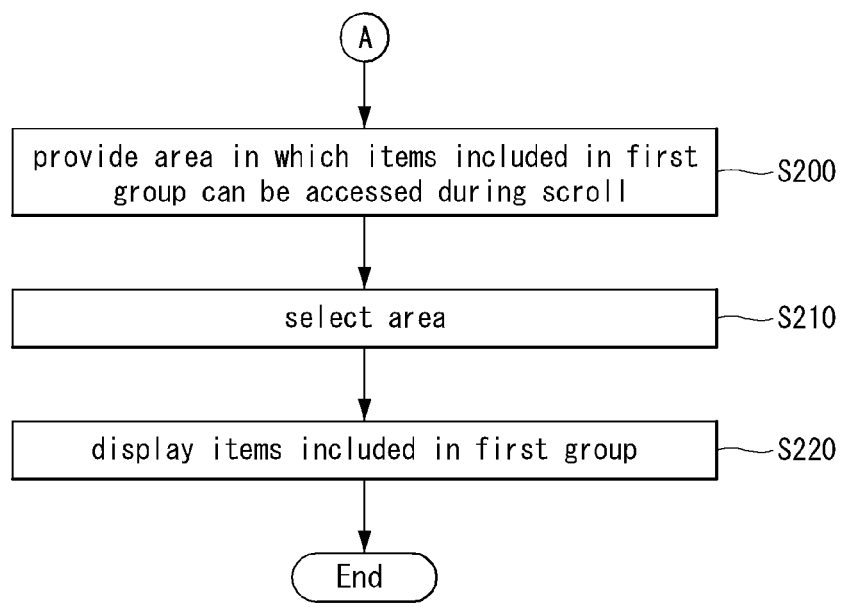
FIG. 10 is a flowchart illustrating a method of controlling a mobile terminal according to a second embodiment of the present invention.

FIG. 10 is a flowchart illustrating a method of controlling a mobile terminal according to a second embodiment of the present invention and FIGS. 11 to 15 are views for explaining the method of controlling the mobile terminal according to the second embodiment of the present invention.

The method of controlling a mobile terminal according to the second embodiment of the present invention may be implemented in the mobile terminal 100 described with reference to FIG. 1. The method of controlling a mobile terminal according to the second embodiment and operations of the mobile terminal 100 to implement the same will now be described in detail with reference to drawings. The second embodiment of the present invention may be based on the first embodiment of the present invention.

Referring to FIG. 10, the controller 180 may provide, to the touchscreen 151, an area in which items belonging to the first group can be accessed while the plurality of items described in the first embodiment are scrolled (S200).

Figure 11:
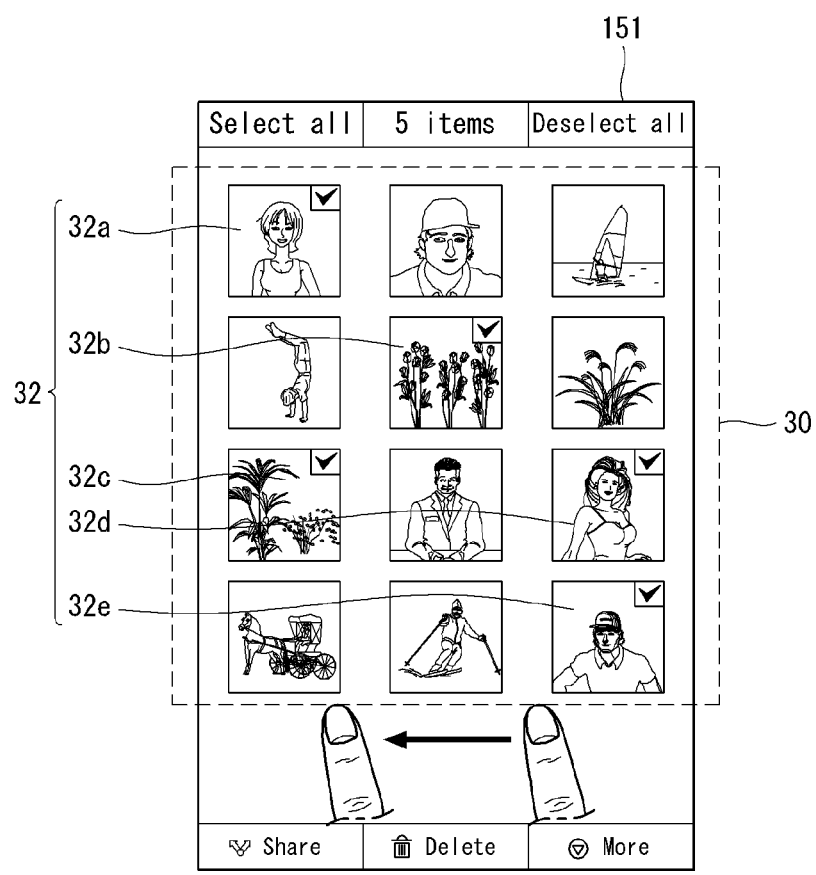
FIGS. 11 to 15 are views for explaining the method of controlling a mobile terminal according to the second embodiment of the present invention.
Figure 12:
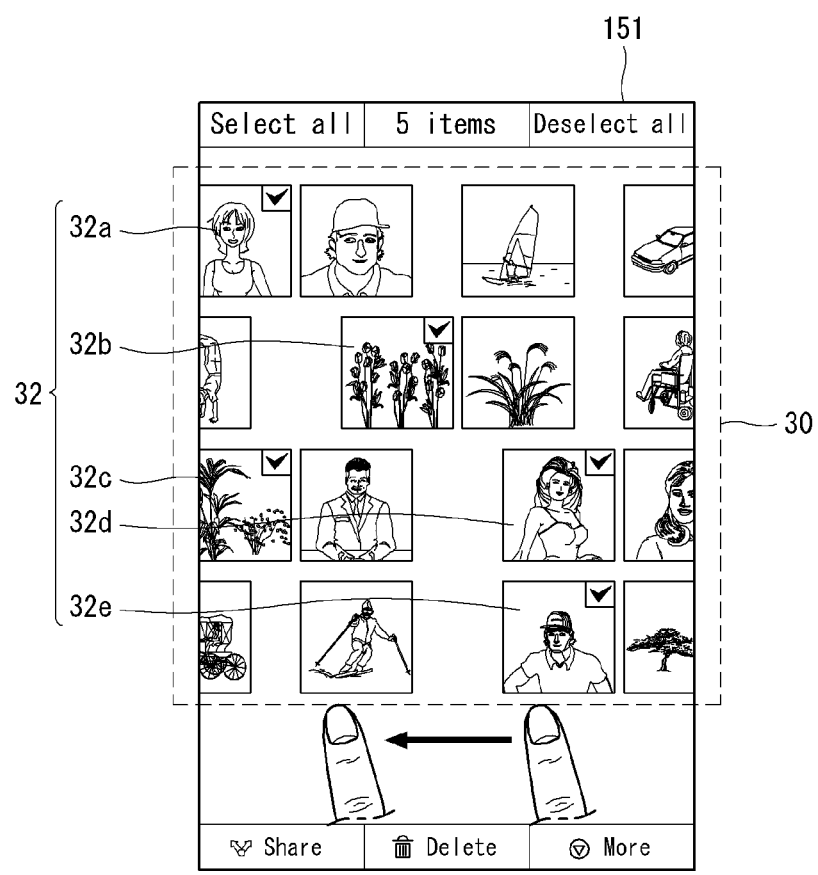

FIGS. 11 and 12 illustrate an example of the first embodiment of the present invention.

Referring to FIG. 11, the controller 180 may display a plurality of video data items on the touchscreen 151.

The user may select at least one of the video data items 30. In FIG. 11, the user selects video data items 32a, 32b, 32c, 32d and 32e.

As described in the first embodiment, the user may apply a stroke in a specific direction to the touchscreen 151. The controller 180 may scroll the plurality of video data items 30 when the stroke is applied.

Referring to FIG. 12, the controller 180 may scroll the video data items 32a, 32b, 32c, 32d and 32e selected by the user at a speed lower than the scroll speed of the other video data items.

That is, the controller 180 can rapidly scroll video data that is not selected by the user and slowly scroll the video data 32a, 32b, 32c, 32d and 32e selected by the user such that the user can select other video data while confirming the selected video data.

Figure 13:
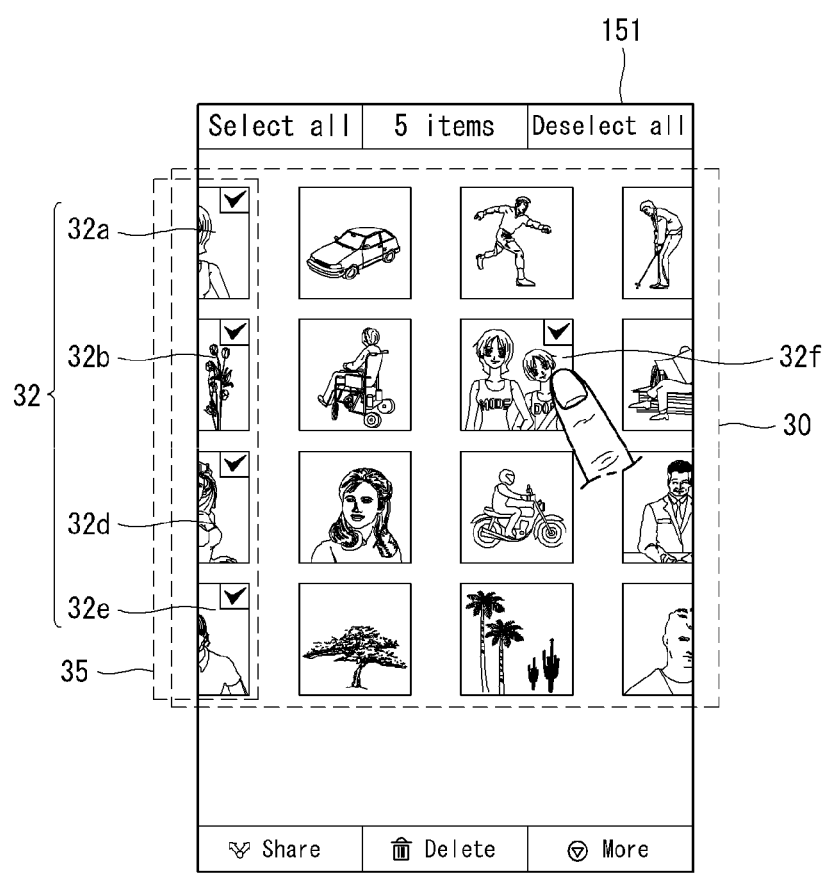

FIG. 13 shows a further scrolled screen.

Referring to FIG. 13, the controller 180 may provide, to the touchscreen 151, an area 35 in which the video data 32a, 32b, 32c, 32d and 32e selected by the user can be accessed.

The area 35 may be located at the edge of the touchscreen 151 to the scroll direction, as shown in FIG. 13. FIG. 13 shows that the user selects another video data 32f.

The controller 180 may display the items included in the first group on the touchscreen 151 (S220) when the area 35 is selected (S210).

Figure 14:
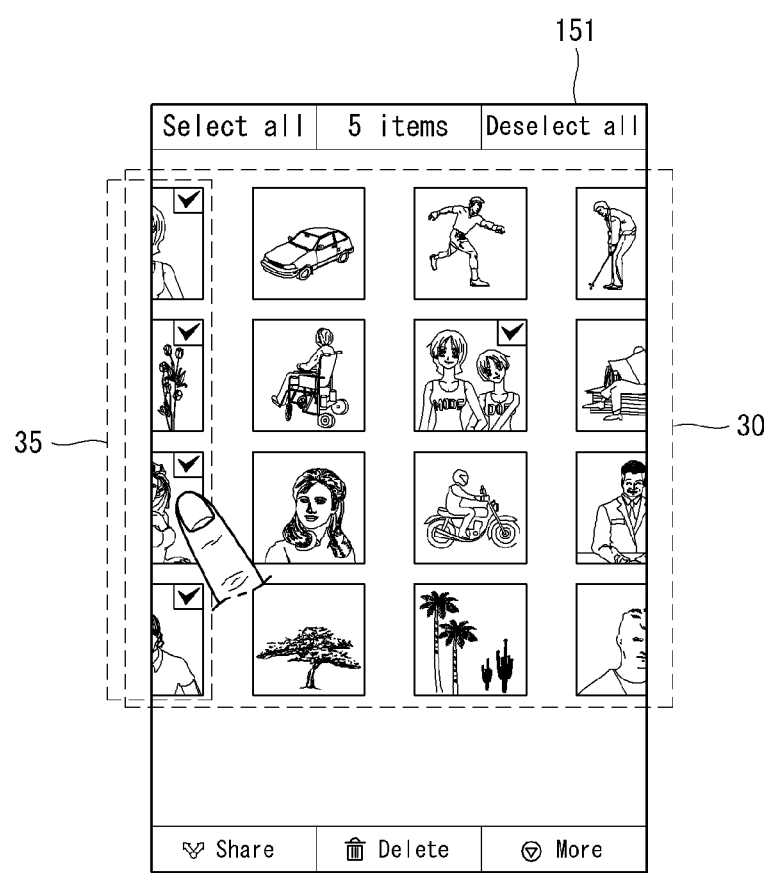

FIG. 14 shows that the user selects the area 35 by touching the area 35 with a finger.

Figure 15:
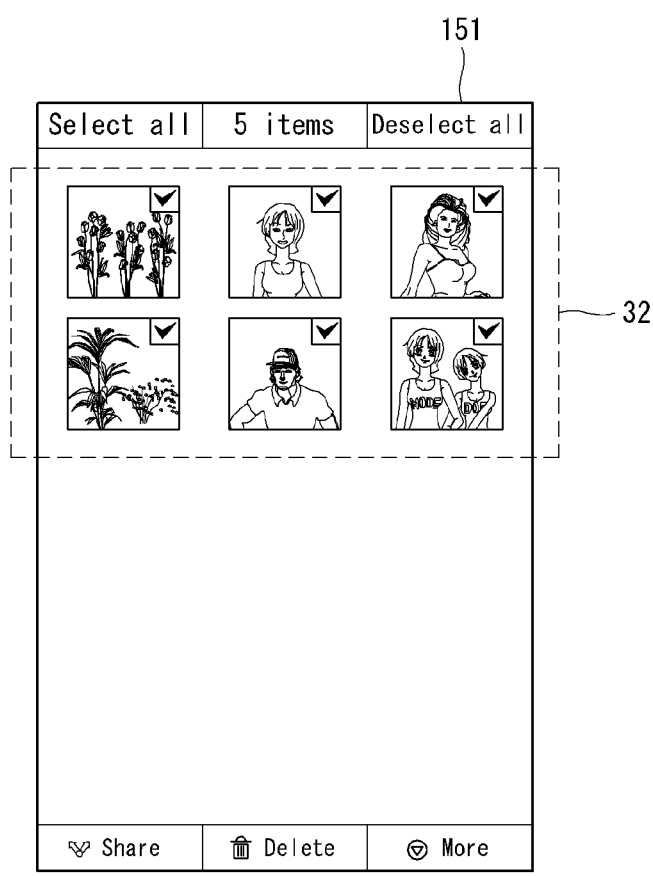

Referring to FIG. 15, the controller 280 may display only video data 32 selected by the user on the touchscreen 151 upon selection of the area 35.

Figure 16:
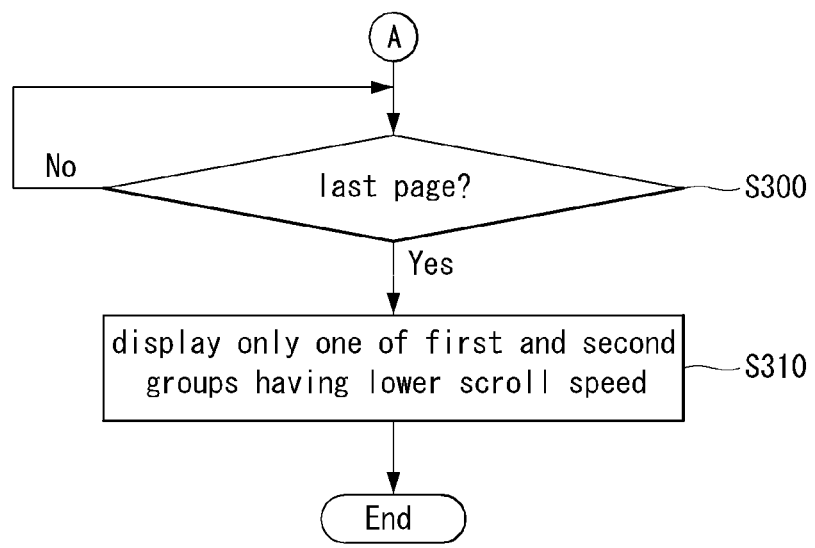
FIG. 16 a flowchart illustrating a method of controlling a mobile terminal according to a third embodiment of the present invention.
Figure 17:
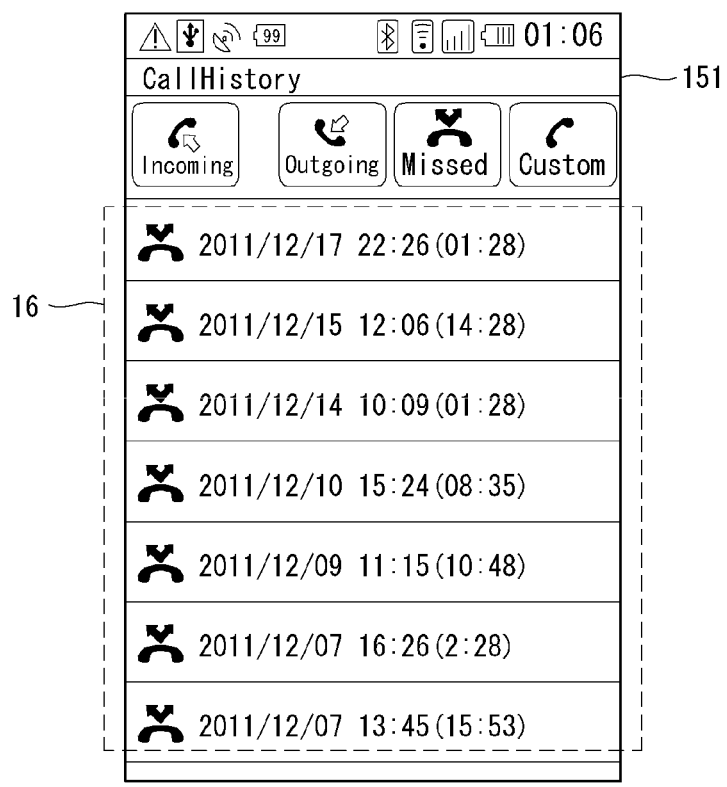
FIGS. 17 to 19 are views for explaining the method of controlling a mobile terminal according to the third embodiment of the present invention.
Figure 18:
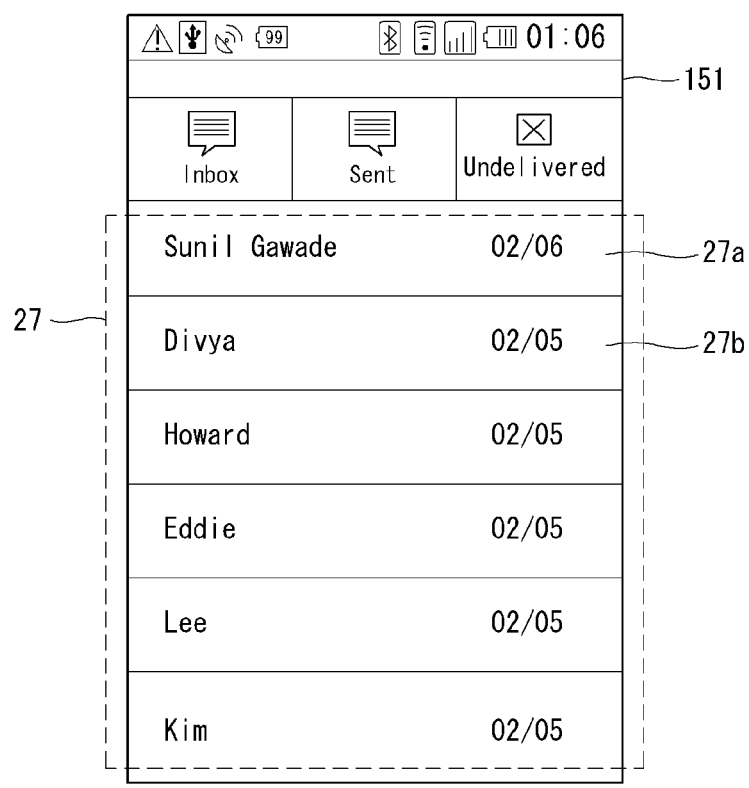
Figure 19:
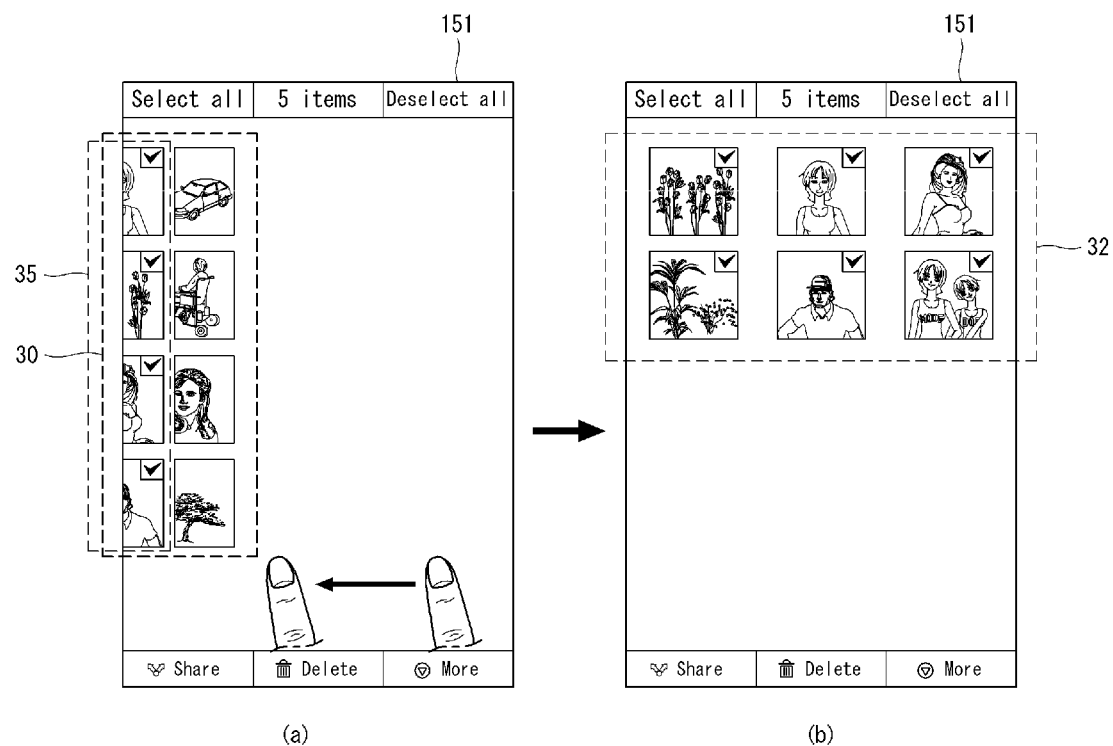

FIG. 16 is a flowchart illustrating a method of controlling a mobile terminal according to a third embodiment of the present invention and FIGS. 17 to 19 are views for explaining the method of controlling the mobile terminal according to the third embodiment of the present invention.

The method of controlling a mobile terminal according to the third embodiment of the present invention may be implemented in the mobile terminal 100 described with reference to FIG. 1. The method of controlling a mobile terminal according to the third embodiment and operations of the mobile terminal 100 to implement the same will now be described in detail with reference to drawings. The third embodiment of the present invention may be based on the second embodiment or on the first and second embodiments of the present invention.

Referring to FIG. 16, the controller 180 may determine whether the last page is displayed after all pages are scrolled (S300).

When the controller 180 determines that the last page is displayed and thus scroll cannot be performed any more in step S300, the controller 180 may display only one of the first and second groups, which has a lower scroll speed, on the touchscreen 151 (S310).

FIG. 17 shows a case in which the user continuously applies a stroke to the touchscreen 151 in the state of FIG. 7 such that the last page is displayed.

Referring to FIG. 17, when the last page is displayed, the controller 180 may display only the first group 16 including the items that require attention of the user, from among the call receipt items 15, on the touchscreen 151.

FIG. 18 shows a case in which the user continuously applies a stroke to the touchscreen 151 in the state of FIG. 9 until the last page is displayed.

Referring to FIG. 18, the controller 180 may display only the first group 27, which includes messages received from people registered to the contact book from among the received messages 25, on the touchscreen 151 when the last page is displayed.

FIG. 19 shows a case in which the user continuously applies a stroke to the touchscreen 151 in the state of FIG. 12 or 13 until the last page is displayed.

Referring to FIG. 19, when the last page is displayed, as shown in FIG. 19(a), the controller 180 may display only the first group 32 including video data selected by the user on the touchscreen 151 while spreading out the area 35 to the right.

The method of controlling a mobile terminal may be written as computer programs and may be implemented in digital microprocessors that execute the programs using a computer readable recording medium.

The method of controlling a mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
a touchscreen configured to display a plurality of items; and
a controller configured to control the touchscreen to scroll the displayed plurality of items in response to a same input such that a first group of the plurality of items is scrolled at a first scroll speed and a second group of the plurality of items is scrolled at a second scroll speed that is different from the first scroll speed,
wherein:
the first group includes either at least one item of the plurality of items that is related to a predetermined event or at least two items grouped together according to a predetermined criterion;
the plurality of items are related to communication history;
the at least one item is related to contact information stored in the mobile terminal; and
other items of the plurality of items are included in the second group not related to the contact information.

2. The mobile terminal of claim 1, wherein the at least one item is related to updated information.

3. The mobile terminal of claim 1, wherein:
each of the plurality of items is selectable;
the at least one item is an item selected for inclusion in the first group; and
other items among the plurality of items that are included in the second group are non-selected items.

4. The mobile terminal of claim 1, wherein the controller is further configured to control the touchscreen to display only all items included in the first group when the plurality of items have been scrolled and a last page displaying a last portion of the plurality of items is reached.

5. The mobile terminal of claim 4, wherein the first scroll speed is slower than the second scroll speed.

6. The mobile terminal of claim 1, wherein the controller is further configured to control the touchscreen to display a first layer that includes the first group and a second layer that includes the second group such that the first layer and the second layer are different from each other.

7. A mobile terminal comprising:
a touchscreen configured to display a plurality of items; and
a controller configured to control the touchscreen to scroll the displayed plurality of items in response to a same input such that a first group of the plurality of items is scrolled at a first scroll speed and a second group of the plurality of items is scrolled at a second scroll speed that is different from the first scroll speed, wherein:
the first group includes either at least one item of the plurality of items that is related to a predetermined event or at least two items grouped together according to a predetermined criterion;
each of the plurality of items is selectable;
the at least one item is an item selected for inclusion in the first group;
other items among the plurality of items that are included in the second group are non-selected items; and
the controller is further configured to control the touchscreen to display a designated area such that the selected at least one item is grouped together with other selected items of the plurality of items in the designated area, and the items in the designated area are accessible when the plurality of items are scrolled.

8. The mobile terminal of claim 7, wherein the controller is further configured to control the touchscreen to display only the items in the designated area when the designated area is selected.

9. A mobile terminal comprising:
a touchscreen configured to display a plurality of items; and
a controller configured to:
control the touchscreen to scroll the displayed plurality of items in response to a same input such that a first group of the plurality of items is scrolled at a first scroll speed and a second group of the plurality of items is scrolled at a second scroll speed that is different from the first scroll speed;
control the touchscreen to display a first layer that includes the first group and a second layer that includes the second group such that the first layer and the second layer are different from each other; and
control the touchscreen to control a depth of the first layer to be different from a depth of the second layer during the scrolling.

10. The mobile terminal of claim 9, wherein the touchscreen is further configured to receive the input.

11. A method of controlling a mobile terminal, the method comprising:
displaying a plurality of items on a touchscreen of the mobile terminal;
receiving an input; and
scrolling a first group of the plurality of items at a first scroll speed and scrolling a second group of the plurality of items at a second scroll speed that is different from the first scroll speed in response to the input,
wherein:
the first group includes either at least one item of the plurality of items that is related to a predetermined event or at least two items grouped together according to a predetermined criterion;

the plurality of items are related to communication history;
the at least one item is related to contact information stored in the mobile terminal; and
other items of the plurality of items are included in the second group not related to the contact information.

12. The method of claim 11, wherein the at least one item is related to updated information.

13. The method of claim 11, wherein:
each of the plurality of items is selectable;
the at least one item is an item selected for inclusion in the first group; and
other items among the plurality of items that are included in the second group are non-selected items.

14. The method of claim 13, further comprising:
displaying a designated area on the touchscreen such that the selected at least one item is grouped together with other selected items of the plurality of items in the designated area,
wherein the items in the designated area are accessible when the plurality of items are scrolled.

15. A method of controlling a mobile terminal, the method comprising:
displaying a plurality of items on a touchscreen of the mobile terminal;
receiving an input; and
scrolling a first group of the plurality of items at a first scroll speed and scrolling a second group of the plurality of items at a second scroll speed that is different from the first scroll speed in response to the input,
wherein:
the first group includes either at least one item of the plurality of items that is related to a predetermined event or at least two items grouped together according to a predetermined criterion;
each of the plurality of items is selectable;
the at least one item is an item selected for inclusion in the first group; and
other items among the plurality of items that are included in the second group are non-selected items;
displaying a designated area on the touchscreen such that the selected at least one item is grouped together with other selected items of the plurality of items in the designated area, wherein the items in the designated area are accessible when the plurality of items are scrolled; and
displaying only the items in the designated area on the touchscreen when the designated area is selected.

16. The method of claim 15, further comprising receiving the input via the touchscreen.

* * * * *